(12) United States Patent
Tsukagoshi et al.

(10) Patent No.: US 7,983,345 B2
(45) Date of Patent: Jul. 19, 2011

(54) CONTENT RECEIVING APPARATUS, VIDEO/AUDIO OUTPUT TIMING CONTROL METHOD, AND CONTENT PROVISION SYSTEM

(75) Inventors: Ikuo Tsukagoshi, Tokyo (JP); Shinji Takada, Kanagawa (JP); Koichi Goto, Kanagawa (JP)

(73) Assignee: Sony Corporation (JP)

( * ) Notice: Subject to any disclaimer, the term of this patent is extended or adjusted under 35 U.S.C. 154(b) by 1279 days.

(21) Appl. No.: 10/570,069

(22) PCT Filed: Jul. 22, 2004

(86) PCT No.: PCT/JP2004/010744
§ 371 (c)(1),
(2), (4) Date: Oct. 19, 2006

(87) PCT Pub. No.: WO2005/025224
PCT Pub. Date: Mar. 17, 2005

(65) Prior Publication Data
US 2007/0092224 A1 Apr. 26, 2007

(30) Foreign Application Priority Data
Sep. 2, 2003 (JP) .............................. P2003-310639

(51) Int. Cl.
*H04N 7/12* (2006.01)
*H04N 11/02* (2006.01)
*H04N 11/04* (2006.01)
(52) U.S. Cl. ................................ 375/240.28
(58) Field of Classification Search ............... 375/240.28
See application file for complete search history.

(56) References Cited

U.S. PATENT DOCUMENTS

| 6,480,537 B1 * | 11/2002 | Agrawal et al. ............... 375/240 |
| 6,493,832 B1 | 12/2002 | Itakura et al. |
| 2002/0141451 A1 | 10/2002 | Gates et al. |

(Continued)

FOREIGN PATENT DOCUMENTS

JP 08-251543 9/1996

(Continued)

OTHER PUBLICATIONS

Hiroshi Yasuda, "Multimedia Fugoka no Kokusai Hyojun", Jun. 30, 1991, pp. 226 to 227.

(Continued)

*Primary Examiner* — Marsha D Banks Harold
*Assistant Examiner* — Chikaodili E Anyikire
(74) *Attorney, Agent, or Firm* — Lerner, David, Littenberg, Krumholz & Mentlik, LLP

(57) ABSTRACT

This invention realizes correct adjustment of lip-syncing of video and audio on a decoder side. According to this invention, a plurality of encoded video frames given video time stamps VTS and a plurality of encoded audio frames given audio time stamps ATS are received and decoded from an encoder side, and the resultant plurality of video frames VF1 and plurality of audio frames AF1 are stored, a time difference which occurs due to a difference between the clock frequency of the reference clock of the encoder side and the clock frequency of the system time clock stc of the decoder side is calculated by a renderer 37, 67, and video frame output timing for sequentially outputting the plurality of video frames VF1 frame by frame is adjusted based on audio frame output timing for sequentially outputting the plurality of audio frames AF1 frame by frame, according to the time difference, resulting in realizing the lip-syncing with keeping sound continuousness.

7 Claims, 11 Drawing Sheets

U.S. PATENT DOCUMENTS

2003/0179879 A1   9/2003   Kranz

FOREIGN PATENT DOCUMENTS

| JP | 08-280008 A   | 10/1996 |
| JP | 2000-134581 A | 5/2000  |
| JP | 2000-152189 A | 5/2000  |
| JP | 2003-169296 A | 6/2003  |
| JP | 2003-179879 A | 6/2003  |

OTHER PUBLICATIONS

Chang Y-J et al: "Design and Implementation of a Real-Time MPEG II Bit Rate Measure System" IEEE Transactions on Consurmer Electronics, vol. 45, No. 1, Feb. 1, 1999, pp. 165-170, XP000888368.

Supplementary European Search Report EP04771005, dated Sep. 1, 2010.

* cited by examiner

CONTENT RECEIVING APPARATUS, VIDEO/AUDIO OUTPUT TIMING CONTROL METHOD, AND CONTENT PROVISION SYSTEM

CROSS REFERENCE TO RELATED APPLICATIONS

The present application is a national phase entry under 35 U.S.C. §371 of International Application No. PCT/JP2004/010744 filed Jul. 22, 2004, published on Mar. 17, 2005 as WO 2005/025224 A1, which claims priority from Japanese Patent Application No. JP 2003-310639 filed in the Japanese Patent Office on Sep. 2, 2003.

TECHNICAL FIELD

This invention relates to a content receiving apparatus, video/audio output timing control method, and content provision system, and is suitably applied to a case of eliminating lip-sync errors for video and audio on a decoder side receiving content, for example.

BACKGROUND ART

Conventionally, in a case of receiving and decoding content from a server of an encoder side, a content receiving apparatus separates and decodes video packets and audio packets which compose the content, and outputs video frames and audio frames based on video time stamps attached to the video packets and audio time stamps attached to the audio packets, so that video output timing and audio output timing match (that is, lip-syncing) (for example, refer to patent reference 1)

Patent Reference 1 Japanese Patent Laid-Open No. 8-280008

By the way, in the content receiving apparatus adopting such a configuration, the system time clock of the decoder side and the reference clock of the encode side may not be in synchronization with each other. In addition, the system time clock of the decoder side and the reference clock of the encoder side may have slightly different clock frequencies due to clock jitter of the system time clock.

Further, in the content receiving apparatus, a video frame and an audio frame have different data lengths. Therefore, even if video frames and video frames are output based on video time stamps and video time stamps when the system time clock of the decoder side and the reference clock of the encoder side are not in synchronization with each other, video output timing and audio output timing do not match, resulting in causing lip-sync errors, which is a problem.

DISCLOSURE OF THE INVENTION

This invention has been made in view of foregoing and proposes a content receiving apparatus, video/audio output timing control method, and content provision system capable of correctly adjusting lip-syncing of video and audio on a decoder side without making a user who is a watcher feel discomfort.

To solve the above problems, this invention provides: a decoding means for receiving and decoding a plurality of encoded video frames sequentially given video time stamps based on the reference clock of an encoder side and a plurality of encoded audio frames sequentially given audio time stamps based on the reference clock, from a content provision apparatus of the encoder side; a storage means for storing a plurality of video frames and a plurality of audio frames obtained by decoding the encoded video frames and the encoded audio frames with the decoding means; a receiving means for receiving the reference clock of the encoder side sent from the content provision apparatus a UDP; a calculation means for synthesizing the system time clock of the decoder side with the reference clock of the encoder side and calculating a time difference which occurs due to a difference between the clock frequency of the reference clock of the encoder side and the clock frequency of the system time clock of the decoder side; and a timing adjustment means for adjusting video frame output timing for sequentially outputting a plurality of video frames frame by frame, on the basis of audio frame output timing for sequentially outputting a plurality of audio frames frame by frame, according to the time difference.

The video frame output timing for sequentially outputting a plurality of video frames frame by frame is adjusted based on the audio frame output timing for sequentially outputting a plurality of audio frames frame by frame, according to the time difference which occurs due to a difference in clock frequency between the reference clock of the encoder side and the system time clock of the decoder side, so as to absorb the difference in the clock frequency between the encoder side and the decoder side, resulting in adjusting the video frame output timing to the audio frame output timing for lip-syncing.

Further, this invention provides: a decoding step of making a decoding means receive and decode a plurality of encoded video frames sequentially given video time stamps based on the reference clock of an encoder side and a plurality of encoded audio frames sequentially given audio time stamps based on the reference clock, from a content provision apparatus of an encoder side; a storage step for making a storage means store a plurality of video frames and a plurality of audio frames obtained by decoding the encoded video frames and the encoded audio frames at the decoding step; a receiving step for receiving the reference clock of encoder side sent from the content provision apparatus with a UDP; a difference calculation step for synthesizing the system time clock of the decoder side with the reference clock of the encoder side and making a calculation means calculate a time difference which occurs due to a difference between the clock frequency of the reference clock of the encoder side and the clock frequency of the system time clock of the decoder side; and a timing adjustment step for making a timing adjustment means adjust video frame output timing for sequentially outputting a plurality of video frames frame by frame, on the basis of the audio frame output timing for sequentially outputting a plurality of audio frames frame by frame, according to the time difference.

The video frame output timing for sequentially outputting a plurality of video frames frame by frame is adjusted based on the audio frame output timing for sequentially outputting a plurality of audio frames frame by frame, according to the time difference which occurs due to the difference in clock frequency between the reference clock of the encoder side and the system time clock of the decoder side, so as to absorb the difference in the clock frequency between the encoder side and the decoder side, resulting in adjusting the video frame output timing to the audio frame output timing for lip-syncing.

Furthermore, according to this invention, in a content provision system composed of a content provision apparatus and a content receiving apparatus, the content provision apparatus comprises: an encoding means for creating a plurality of encoded video frames given video time stamps based on the reference clock of the encoder side and a plurality of encoded audio frames given audio time stamps based on the reference clock; a first transmission means for sequentially transmitting the plurality of encoded video frames and the plurality of encoded audio frames to the content receiving apparatus; and a second transmission means for transmitting the reference clock of the encoder side with a UDP. The content receiving apparatus comprises: a decoding means for receiving and decoding a plurality of encoded video frames sequentially given video time stamps and a plurality of encoded audio frames sequentially given audio time stamps from the content provision apparatus of the encoder side; a storage means for storing a plurality of video frames and a plurality of audio frames obtained by decoding the encoded video frames and the encoded audio frames with the decoding means; a calculation means for calculating a time difference which occurs due to a difference between the clock frequency of the reference clock of the encoder side and the clock frequency of the system time clock of the decoder side; and a timing adjustment means for adjusting video frame output timing for sequentially outputting a plurality of video frames frame by frame, on the basis of audio frame output timing for sequentially outputting a plurality of audio frames frame by frame, according to the time difference.

The video frame output timing for sequentially outputting a plurality of video frames frame by frame is adjusted based on the audio frame output timing for sequentially outputting a plurality of audio frames frame by frame, according to the time difference which occurs due to the difference in clock frequency between the reference clock of the encoder side and the system time clock of the decoder side, so as to absorb the difference in the clock frequency between the encoder side and the decoder side, resulting in adjusting the video frame output timing to the audio frame output timing for lip-syncing.

According to this invention as described above, video frame output timing for sequentially outputting a plurality of video frames frame by frame is adjusted based on audio frame output timing for sequentially outputting a plurality of audio frames frame by frame, according to a time difference which occurs due to a difference in clock frequency between the reference clock of the encoder side and the system time clock of the decoder side, so as to absorb the difference in the clock frequency between the encoder side and the decoder side, resulting in adjusting the video frame output timing to the audio frame output timing for lip-syncing. As a result, a content receiving apparatus, video/audio output timing control method, and content provision system capable of correctly adjusting the lip-syncing of video and audio on the decoder side without making a user who is a watcher feel discomfort can be realized.

BEST MODE FOR CARRYING OUT THE INVENTION

One embodiment will be hereinafter described with reference to the accompanying drawings.

(1). Entire Construction of a Content Provision System

Figure 1:
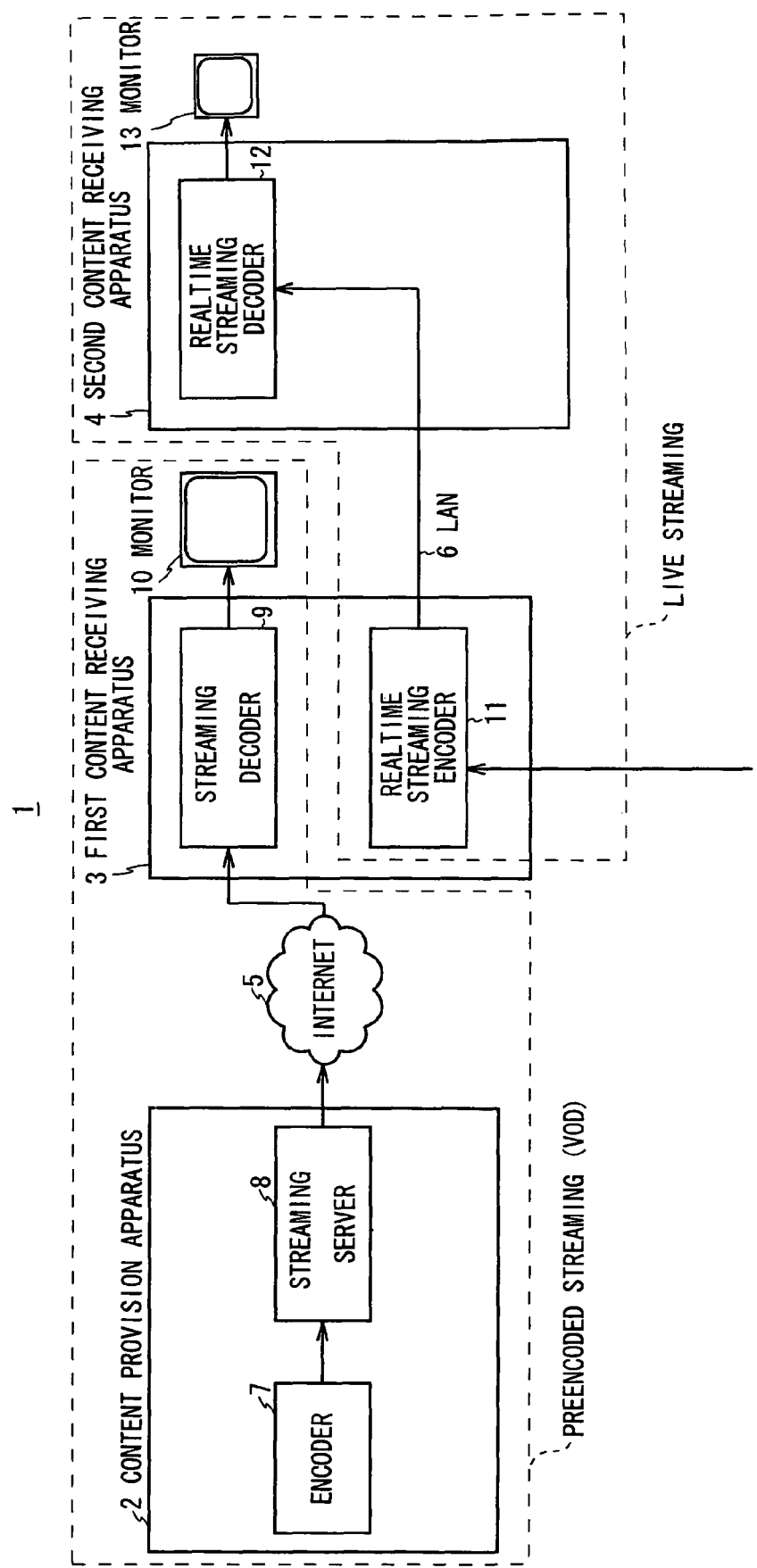
FIG. 1 is a schematic block diagram showing an entire construction of a content provision system to show an entire streaming system.

Referring to FIG. 1, reference numeral 1 shows a content provision system of this invention which is roughly composed of a content provision apparatus 2 which is a content distribution side, and a first content receiving apparatus 3 and a second content receiving apparatus 4 which are content receiving sides.

In the content provision system 1, the content provision apparatus 2 and the first content receiving apparatus 3 are connected to each other over the Internet 5. For example, pre-encoded streaming such as a video-on-demand (VOD) which distributes content from the content provision apparatus 2 in response to a request from the first content receiving apparatus 3 can be realized.

In the content provision apparatus 2, a streaming server 8 packetizes an elementary stream ES which has been encoded and stored in an encoder 7, and distributes the resultant to the first content receiving apparatus 3 via the Internet 5.

In the first content receiving apparatus 3, a streaming decoder 9 restores the original video and audio by decoding the elementary stream ES and then the original video and audio are output from a monitor 10.

In addition, in this content provision system 1, the first content receiving apparatus 3 and the second content receiving apparatus 4 are connected to each other via a wireless LAN 6 under standards, for example, IEEE (Institute of Electrical and Electronics Engineers) 802.11a/b/g. The first content receiving apparatus 3 can encode received content of digital terrestrial, BS (Broadcast Satellite)/CS (Communication Satellite) digital or analog terrestrial broadcasting supplied, or content from DVDs (Digital Versatile Disc), Video CDs, and general video cameras in real time and then transfer them by radio to the second content receiving apparatus 4.

In this connection, the first content receiving apparatus 3 and the second content receiving apparatus 4 unnecessarily have to be connected via the wireless LAN 6, but can be connected via a wired LAN.

The second content receiving apparatus 4 decodes content received from the first content receiving apparatus 3 with a realtime streaming decoder 12 to perform streaming reproduction, and outputs the reproduction result to a monitor 13.

Thus, between the first content receiving apparatus 3 and the second content receiving apparatus 4, the first content receiving apparatus 3 encodes the received content in realtime and sends the resultant to the second content receiving apparatus 4, and the second content receiving apparatus 4 performs the streaming reproduction, so as to realize live streaming.

(2) Construction of Content Provision Apparatus

Figure 2:
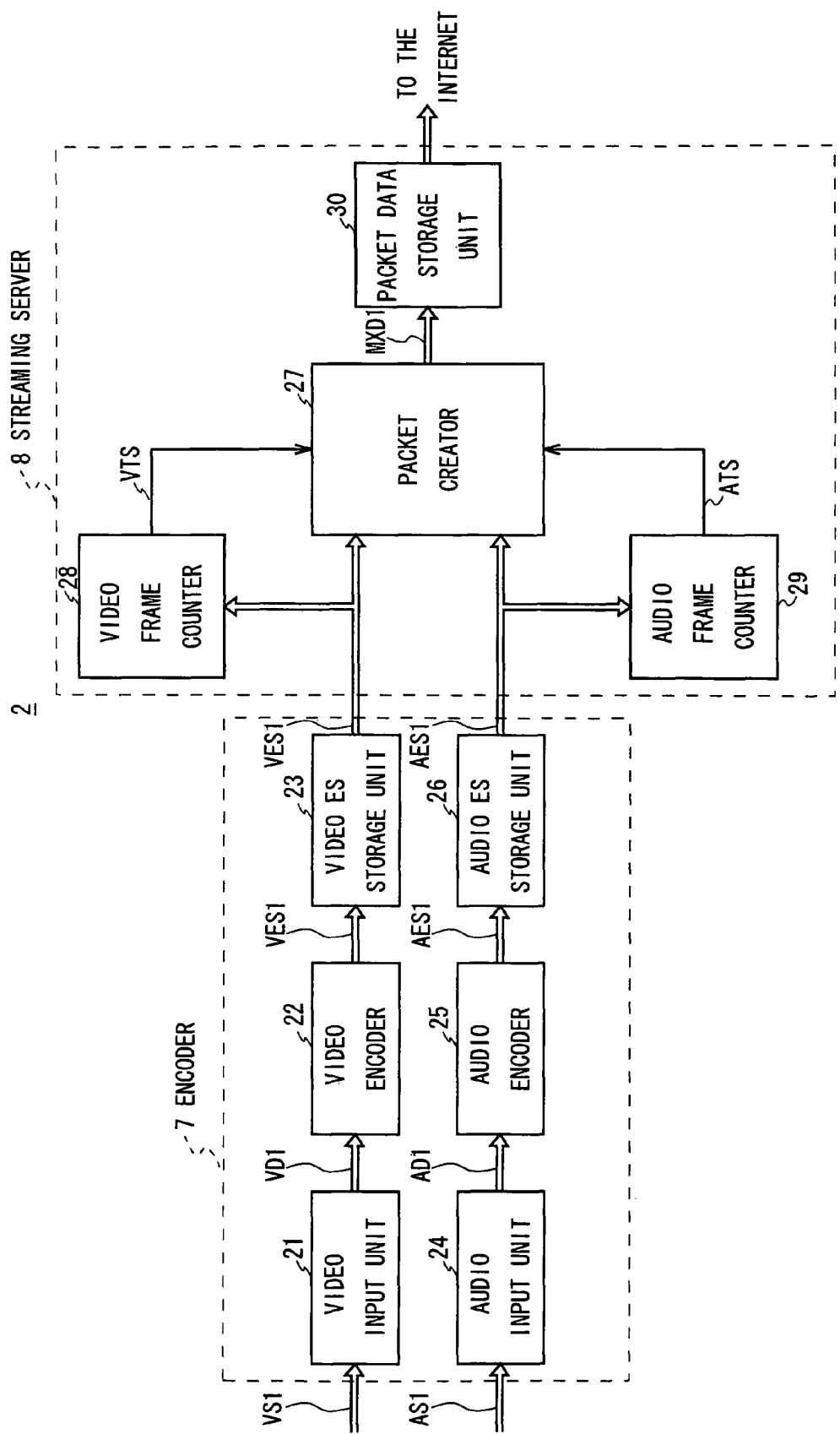
FIG. 2 is a schematic block diagram showing circuitry of a content provision apparatus.

Referring to FIG. 2, the content provision apparatus 2 is composed of the encoder 7 and the streaming server 8. A video signal VS1 taken in is sent to a video encoder 22 via a video input unit 21.

The video encoder 22 compresses and encodes the video signal VS1 with a prescribed compression-encoding method under the MPEG1/2/4 (Moving Picture Experts Group) standards or another compression-encoding method, and gives the resultant video elementary stream VES1 to a video ES storage unit 23 comprising a ring buffer.

The video ES storage unit 23 stores the video elementary stream VES1 once and then gives the video elementary stream VES1 to a packet creator 27 and a video frame counter 28 of the streaming server 8.

The video frame counter 28 counts the video elementary stream VES1 on a frame frequency basis (29.97 [Hz], 30 [Hz], 59.94 [Hz] or 60 [Hz]) and converts the counted value into a value in a unit of 90 [Khz], based on the reference clock, and gives the resultant to the packet creator 27 as a video time stamp VTS (VTS1, VTS2, VTS3, . . . ) represented in 32 bits for a corresponding video frame.

The content provision apparatus 2, on the contrary, gives an audio signal AS1 taken in, to an audio encoder 25 via an audio input unit 24 of the streaming encoder 7.

The audio encoder 25 compresses and encodes the audio signal AS with a prescribed compression-encoding method under the MPEG1/2/4 audio standards or another compression-encoding method, and gives the resultant audio elementary stream AES1 to an audio ES storage unit 26 comprising a ring buffer.

The audio ES storage unit 26 stores the audio elementary stream AES1 once, and gives the audio elementary stream AES1 to the packet creator 27 and an audio frame counter 29 of the streaming server 8.

Similarly to the video frame counter 28, the audio frame counter 29 converts the counted value for an audio frame, into a value in a unit of 90 [KHz], based on the reference clock which is a common with video, and gives the resultant to the packet creator 27 as an audio time stamp ATS (ATS1, ATS2, ATS3, . . . ) represented in 32 bits, for the audio frame.

The packet creator 27 divides the video elementary stream VES1 into packets of a prescribed data size, and creates video packets by adding video header information to each packet. In addition, the packet creator 27 divides the audio elementary stream AES1 into packets of a prescribed data size, and creates audio packets by adding audio header information to each packet.

Figure 3:
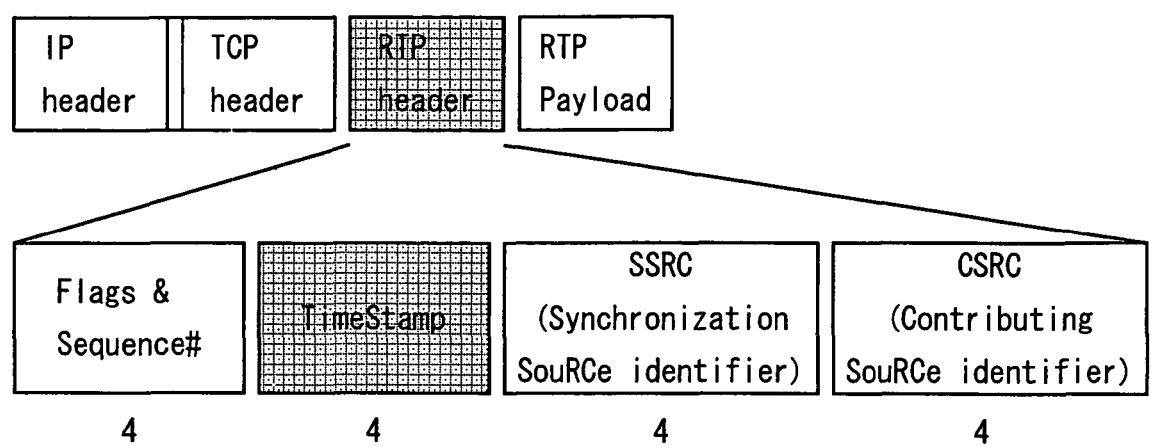
FIG. 3 is a schematic diagram showing a structure of a time stamp (TCP protocol) of an audio packet and a video packet.

Referring to FIG. 3, each of the audio packets and the video packets is composed of an IP (Internet Protocol) header, a TCP (Transmission Control Protocol) header, an RTP (Real-time Transport Protocol) header, and an RTP payload. An above-described audio time stamp ATS or video time stamp VTS is written in a time stamp region of 4 bytes in the RTP header.

Then the packet creator 27 creates video packet data of prescribed bytes based on a video packet and a video time stamp VTS, and creates audio packet data of prescribed bytes based on an audio packet and an audio time stamp ATS, and creates multiplexed data MXD1 by multiplexing them, and sends it to the packet data storage unit 30.

When a prescribed amount of multiplexed data MXD1 is stored, the packet data storage unit 30 transmits the multiplexed data MXD1 on a packet basis, to the first content receiving apparatus 3 via the Internet 5 with the RTP/TCP (RealTime TransportProtocol/Transmission Control Protocol).

(3) Module Structure of Streaming Decoder in First Content Receiving Apparatus

Figure 4:
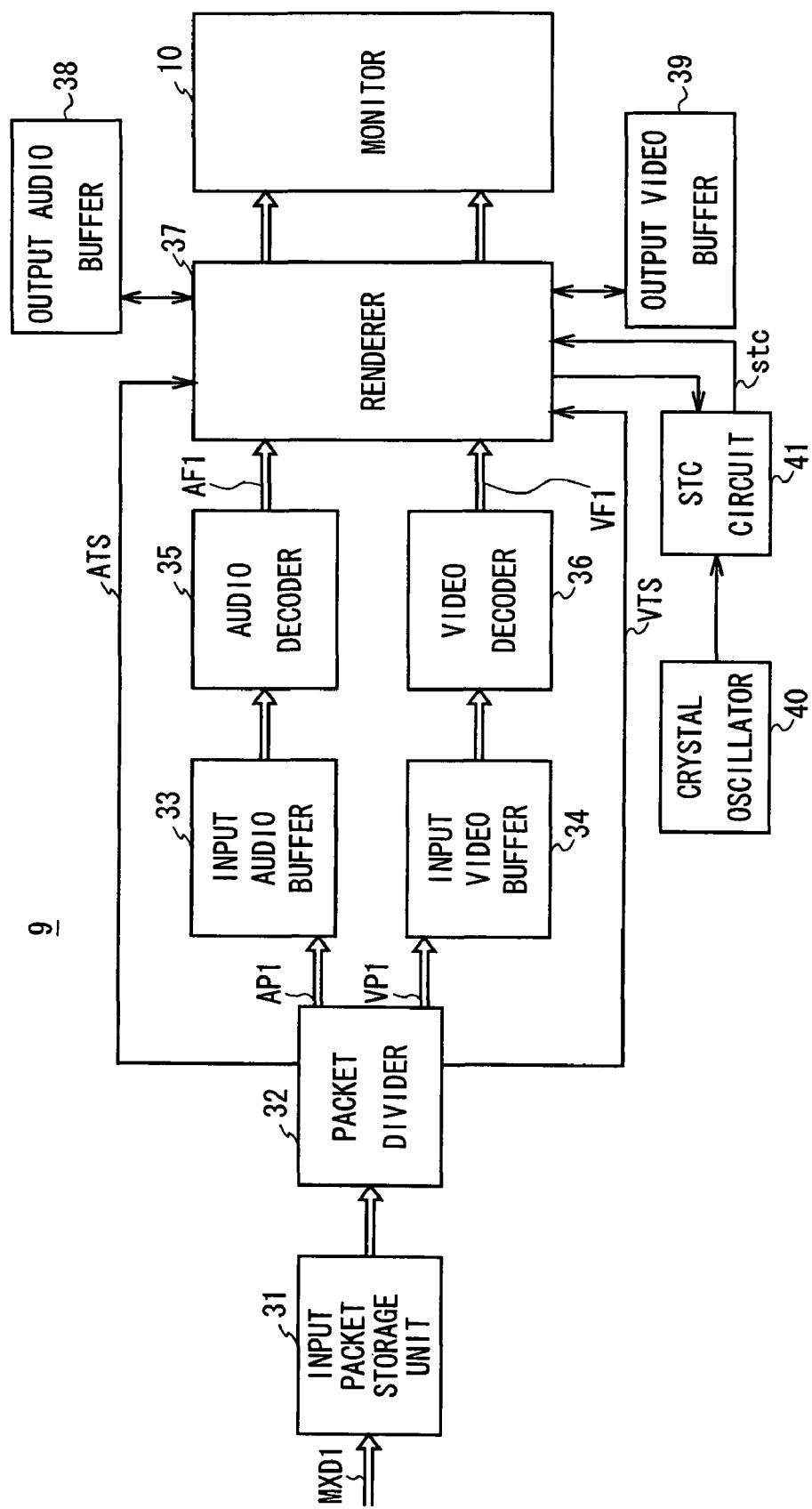
FIG. 4 is a schematic block diagram showing a module structure of a streaming decoder in a first content receiving apparatus.

Referring to FIG. 4, the first content receiving apparatus 3 stores the multiplexed data MXD1 received from the content provision apparatus 2 with RTP/TCP, in an input packet storage unit 31 once, and then gives it to a packet divider 32.

The packet divider 32 divides the multiplexed data MXD1 into video packet data VP1 and audio packet data AP1, and further divides the audio packet data AP1 into audio packets and audio time stamps ATS, and gives the audio packets to an audio decoder 35 via an input audio buffer 33 comprising a ring buffer on an audio frame basis and gives the audio stamps ATS to a renderer 37.

In addition, the packet divider 32 divides the video packet data VP1 into video packets and video time stamps VTS, and gives the video packets on a frame basis to a video decoder 36 via an input video buffer 34 comprising a ring buffer and gives the video time stamps VTS to the renderer 37.

The audio decoder 35 decodes the audio packet data AP1 on an audio frame basis to restore the audio frames AF1 before the compression-encoding process, and sequentially sends them to the renderer 37.

The video decoder 36 decodes the video packet data VP1 on a video frame basis to restore the video frames VF1 before the compression-encoding process, and sequentially sends them to the renderer 37.

The renderer 37 stores the audio time stamps ATS in a queue (not shown) and temporarily stores the audio frames AF1 in the output audio buffer 38 comprising a ring buffer. Similarly, the renderer 37 stores the video time stamps VTS in a queue (not shown) and temporarily stores the video frames VF1 in the output video buffer 39 comprising a ring buffer.

The renderer 37 adjusts the final output timing based on the audio time stamps ATS and the video time stamps VTS for lip-syncing of the video of the video frames VF1 and the audio of the audio frames AF1 to be output to the monitor 10, and then sequentially outputs the video frames VF1 and the audio frames AF1 from the output video buffer 39 and the output audio buffer 38 at the output timing.

Figure 5:
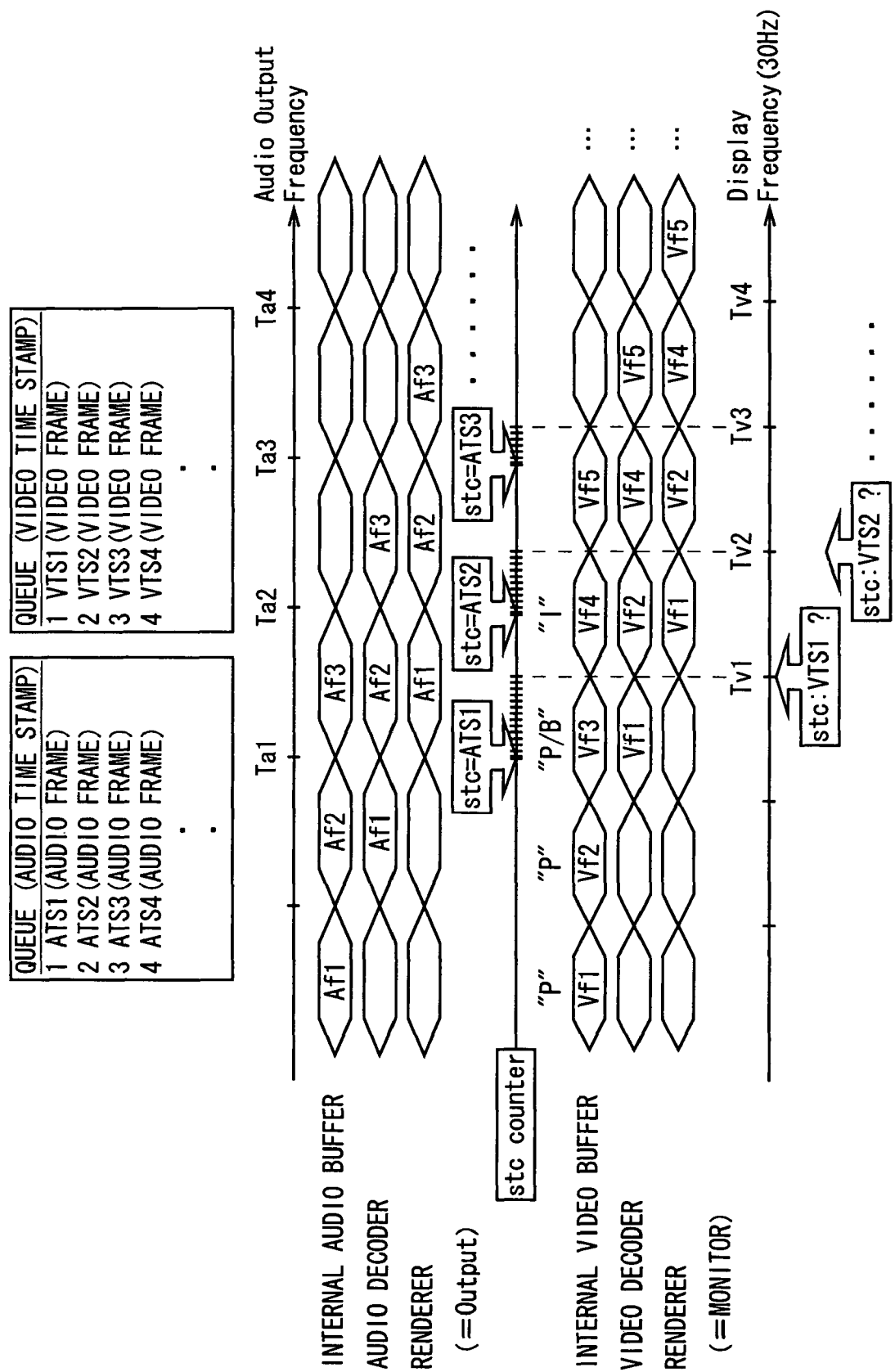
FIG. 5 is a schematic diagram explaining output timing of video frames and audio frames in pre-encoded streaming.

(4) Lip-Syncing Adjustment Procedure on Decoder Side (4-1) Output Timing Adjustment Method of Video Frames and Audio Frames in Pre-Encoded Streaming As shown in FIG. 5, the renderer 37 first presets the value of a system time clock stc received via a crystal oscillator circuit 40 and a system time clock circuit 41, with an audio stamp ATS (ATS1, ATS2, ATS3, . . . ) at time Ta1, Ta2, Ta3, . . . for sequentially outputting audio frames AF1 (Af1, Af2, Af3, . . . ) decoded by the audio decoder, to the monitor 10. In other words, the renderer 37 adjusts (replaces) the value of the system time clock stc to (with) an audio time stamp ATS (ATS1, ATS2, ATS3, . . . ).

This is because interruption or skip of output sound stands out for users and therefore, the renderer 37 has to adjust output timing of the video frames VF1 (Vf1, Vf2, Vf3, . . . ) to the output timing of the audio frames AF1 (Af1, Af2, Af3, . . . ), with the audio frames AF1 (Af1, Af2, Af3, . . . ) as a basis of the lip-syncing adjustment process.

When the output timing (times Ta1, Ta2, Ta3, . . . ) of the audio frames AF1 (Af1, Af2, Af3, . . . ) is determined, the renderer 37 compares the counted value of the system time clock stc preset, with the video time stamps VTS (VTS1, VTS2, VTS3, . . . ) attached to the video frames VF1 (Vf1, Vf2, Vf3, . . . ) at certain times Tv1, Tv2, Tv3, . . . for outputting the video frames VF1 (Vf1, Vf2, Vf3, . . . ) at a frame frequency of 30 [Hz] based on the system time clock stc.

Matching of the counted value of the system time clock stc preset and the video time stamps VTS (VTS1, VTS2, VTS3, . . . ) means that the audio time stamps ATS (ATS1, ATS2, ATS3, . . . ) and the video time stamps VTS (VTS1, VTS2, VTS3, . . . ) given on the encoder side have the same temporal correspondence and the reference clock of the encoder side and the system time clock stc of the decoder side has exactly the same clock frequency.

That is, this indicates that video and audio are output at the same timing even when the renderer 37 outputs the audio frames AF1 and the video frames VF1 to the monitor 10 at timing of the audio time stamps ATS and the video time stamps VTS based on the system time clock stc of the decoder side.

Even if the comparison result shows that the counted value of the system time clock stc preset and the video time stamps VTS (VTS1, VTS2, VTS3, . . . ) do not fully match, users cannot recognize that video and audio do not match when a differential value D1 (time difference) between the counted value of the system time clock stc preset and each video time stamp VTS (VTS1, VTS2, VTS3, . . . ) is a threshold value TH representing a prescribed time or lower. In this case, the renderer 37 can output the video frames VF1 (Vf1, Vf2, Vf3, . . . ) to the monitor 10 according to the video time stamps VTS (VTS1, VTS2, VTS3, . . . ).

In another case, that is, in a case where, at time Tv2, a differential value D1 between the counted value of the system time clock stc preset and, for example, the video time stamp VTS2 is larger than the threshold value TH and video is behind audio, different clock frequencies of the encoder side and the decoder side causes such a situation that the video is behind the audio. In this case, the renderer 37 skips the video frame Vf3 corresponding to, for example, a B-picture composing a GOP (Group Of Picture) without decoding, and outputs the next video frame Vf4.

On the other hand, in a case where, at time Tv2, the differential value D1 between the counted value of the system time clock stc presetting and, for example, the video time stamp VTS2 is larger than the prescribed threshold value TH and audio is behind video, the different clock frequencies of the encoder side and the decoder side causes such a situation that the audio is behind the video. In this case, the renderer 37 repeatedly outputs the video frame Vf2 being output.

(4-2) Lip-Syncing Adjustment Procedure in Pre-Encoded Streaming

Figure 6:
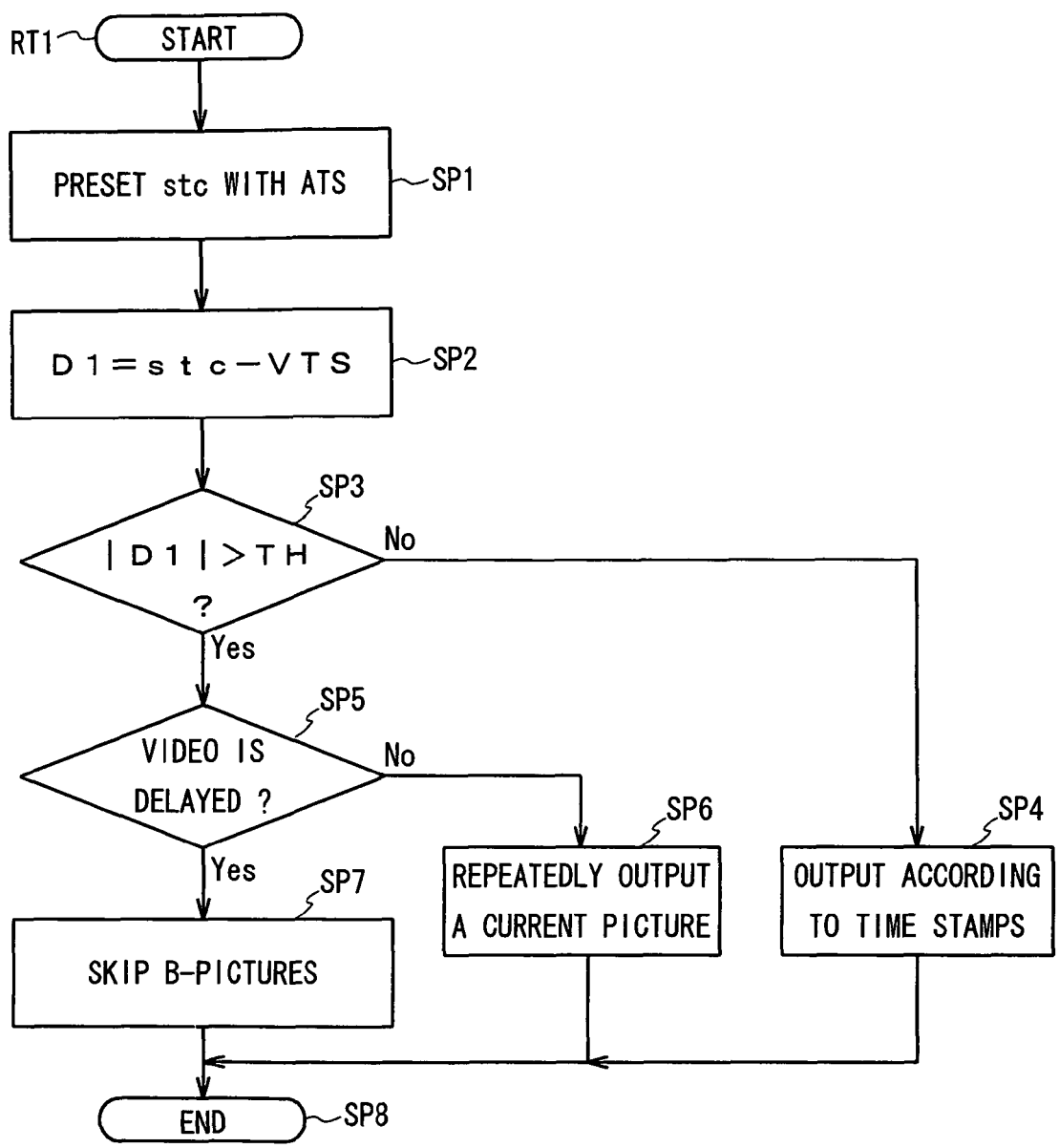
FIG. 6 is a schematic flowchart showing a lip-syncing adjustment procedure in the pre-encoded streaming.

An output timing adjustment method by the renderer 37 of the streaming decoder 9 to adjust the output timing of the video frames VF1 (Vf1, Vf2, Vf3, . . . ) based on the audio frames AF1 (Af1, Af2, Af3, . . . ) as described above for the lip-syncing of video and audio will be summarized. As shown in the flowchart of FIG. 6, the renderer 37 of the streaming decoder 9 enters the start step of the routine RT1 and moves on to next step SP1.

At step SP1, the renderer 37 presets the value of the system time clock stc with the value of the audio time stamps ATS (ATS1, ATS2, ATS3, . . . ) at times Ta1, Ta2, Ta3, . . . for outputting the audio frames AF1 (Af1, Af2, Af3, . . . ) to the monitor 10, and then moves on to next step SP2.

At step SP2, the renderer 37 calculates the differential value D1 between the time stamp VTS (VTS1, VTS2 VTS3, . . . ) of a video frame VF1 (Vf1, Vf2, Vf3, . . . ) to be output at time Tv1, Tv2, Tv3, . . . and the counted value of the system time clock stc preset at time Tv1, Tv2, Tv3, . . . , and moves on to next step SP3.

At step SP3, the renderer 37 determines whether the differential value D1 (absolute value) calculated at step SP2 is larger than the prescribed threshold value TH. A negative result here means that the differential value D1 is a time (for example, 100 [msec]) or shorter and users watching video and audio cannot recognize a lag between the video and the audio. In this case, the renderer 37 moves on to next step SP4.

At the step SP4, since there is only little time difference and the users cannot recognize a lag between video and audio, the renderer 37 outputs the video frame VF1 to the monitor 10 as it is and outputs the audio frame AF1 to the monitor as it is, and then moves on to next step SP8 where this procedure is completed.

An affirmative result at step SP3, on the contrary, means that the differential value D1 is larger than the prescribed threshold value TH, that is, that users watching video and audio can recognize a lag between the video and the audio. At this time, the renderer 37 moves on to next step SP5.

At step SP5, the renderer 37 determines whether video is behind audio, based on the audio time stamp ATS and the video time stamp VTS. When a negative result is obtained, the renderer 37 moves on to step SP6.

At step SP6, since the audio is behind the video, the renderer 37 repeatedly outputs the video frame VF1 composing a picture being output so that the audio catches up with the video, and then moves on to next step SP8 where this process is completed.

An affirmative result at step SP5 means that the video is behind the audio. At this time, the renderer 37 moves on to next step SP7 to skip, for example, a B-picture (video frame Vf3) without decoding so as to eliminate the delay, so that the video can catch up with the audio for the lip-syncing, and then moves on to next step SP8 where this process is completed.

In this case, the renderer 37 does not skip "P" pictures being stored in the output video buffer 39 because they are reference frames for decoding next pictures in the video decoder 36, and skips "B" pictures which are not affected by the skipping, resulting in realizing the lip-syncing while previously avoiding picture quality deterioration.

(5) Circuitry of Realtime Streaming Encoder in First Content Receiving Apparatus The first content receiving apparatus 3 (FIG. 1) can operate as a content provision apparatus by encoding externally supplied content of digital terrestrial, BS/CS digital or analog terrestrial broadcasting, or content from DVDs, Video CD, or general video cameras in realtime and then transmitting the resultant by radio to the second content receiving apparatus 4.

Figure 7:
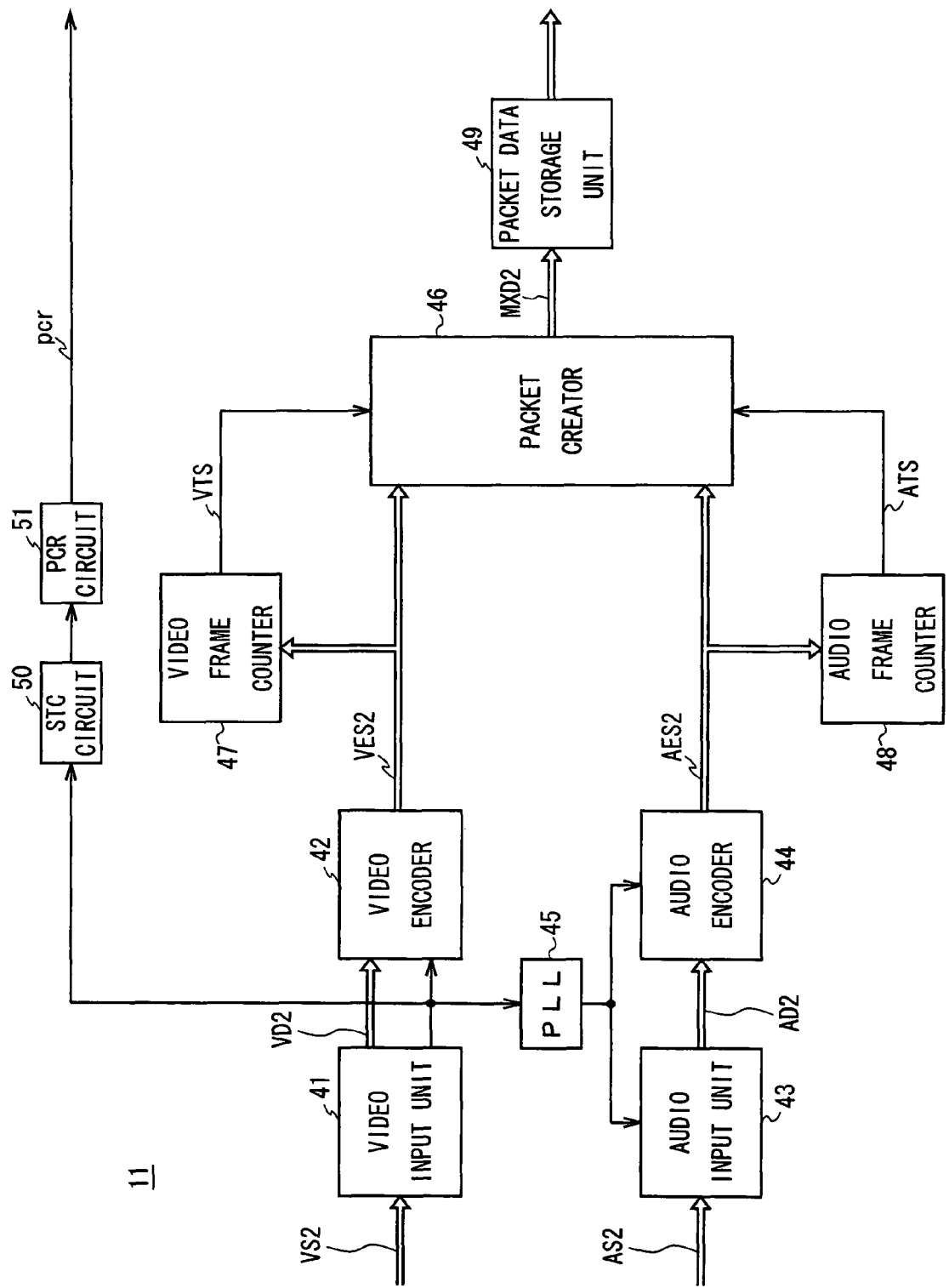
FIG. 7 is a schematic block diagram showing circuitry of a realtime streaming encoder in the first content receiving apparatus.

The circuitry of the realtime streaming encoder 11 of the first content receiving apparatus 3 will be described with reference to FIG. 7. The realtime streaming encoder 11 converts a video signal VS2 and an audio signal AS2 composing externally supplied content into digital signals via the video input unit 41 and the audio input unit 43, and sends these to the video encoder 42 and the audio encoder 44 as video data VD2 and audio data AD2.

The video encoder 42 compresses and encodes the video data VD2 with a prescribed compression-encoding method under the MPEG1/2/4 standards or another compression-encoding method, and sends the resultant video elementary stream VES2 to a packet creator 46 and a video frame counter 47.

The video frame counter 47 counts the video elementary stream VES2 on a frame frequency basis (29.97 [Hz], 30 [Hz], 59.94 [Hz], or 60 Hz), converts the counted value into a value in a unit of 90 [KHz] based on the reference clock, and sends the resultant to the packet creator 46 as video time stamps VTS (VTS1, VTS2, VTS3, . . . ) represented in 32 bits for the video frames.

The audio encoder 44 compresses and encodes the audio data AD2 with a prescribed compression-encoding method under the MPEG1/2/4 audio standards or another compression-encoding method, and sends the resultant audio elementary stream AES2 to the packet creator 46 and an audio frame counter 48.

Similarly to the video frame counter 47, the audio frame counter 48 converts the counted value of the audio frame into a value in a unit of 90 [KHz] based on the common reference clock, represents the resultant in 32 bits as audio time stamps ATS (ATS1, ATS2, ATS3, . . . ) and sends them to the packet creator 46.

The packet creator 46 divides the video elementary stream VES2 into packets of a prescribed data size to create video packets by adding video header information to each packet, and divides the audio elementary stream AES2 into packets of a prescribed data size to create audio packets by adding audio header information to each packet.

Figure 8:
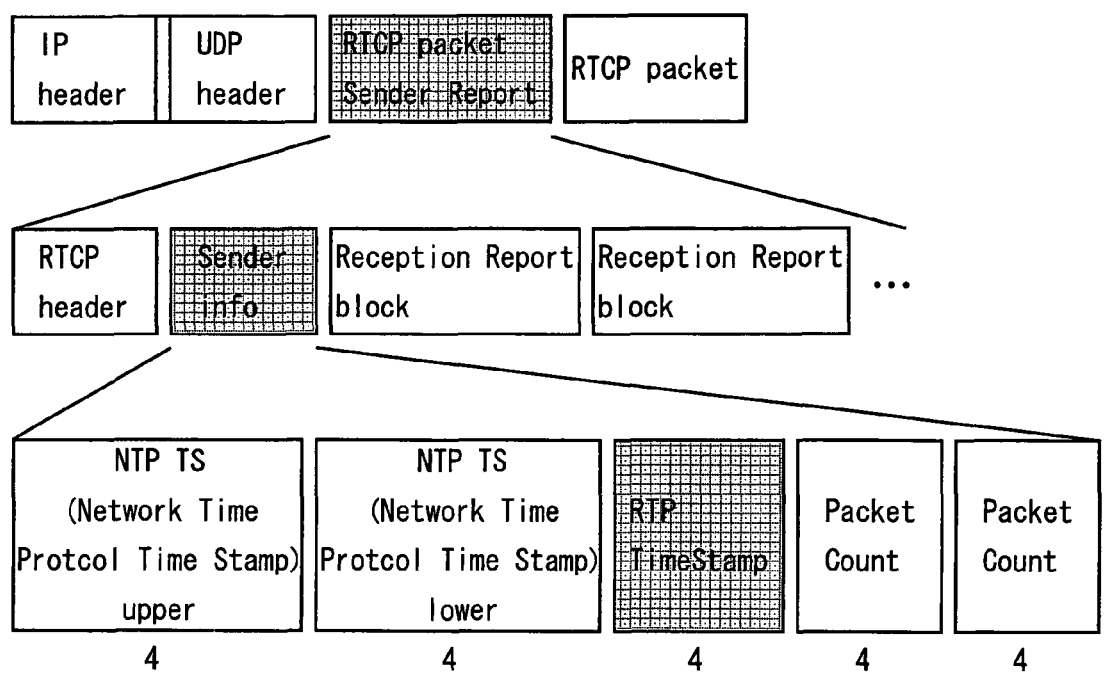
FIG. 8 is a schematic diagram showing a structure of a PCR (UDP protocol) of a control packet.

As shown in FIG. 8, a control packet is composed of an IP (Internet Protocol) header, a UDP (User Datagram Protocol) header, an RTCP (Real Time Control Protocol) packet sender report, and an RTCP packet. Snap shot information of the system time clock STC value on the encoder side is written as a PCR value in an RTP time stamp region of 4 bytes in the sender information of the RTCP packet sender report, and is sent from the PCR circuit 41 for clock recovery of the decoder side.

Then the packet creator 46 creates video packet data of prescribed bytes based on the video packets and the video time stamps VTS, and creates audio packet data of prescribed bytes based on the audio packets and the video time stamps ATS, and creates multiplexed data MXD2 by multiplexing them as shown in FIG. 3, and then sends the data to a packet data storage unit 49.

When a prescribed amount of multiplexed data MXD2 is stored, the packet data storage unit 49 sends the multiplexed data MXD2 packet by packet to the second content receiving apparatus 4 with the RTP/TCP via the wireless LAN 6.

By the way, the realtime streaming encoder 11 supplies the video data VD2 digitized by the video input unit 41, also to a PLL (Phase-Locked Loop) circuit 45. The PLL circuit 45 synchronizes the system time clock circuit 50 with the clock frequency of the video data VD2 based on the video data VD2, and synthesizes the video encoder 42, the audio input unit 43, and the audio encoder 44 with the clock frequency of the video data VD2.

Therefore, the realtime streaming encoder 11 is capable of compressing and encoding the video data VD2 and the audio data AD2 via the PLL circuit 45 at timing synchronized with the clock frequency of the video data VD2, and of sending to the realtime streaming decoder 12 of the second content receiving apparatus 4 a clock reference pcr synchronized with the clock frequency of the video data VD2 via the PCR (Program Clock Reference) circuit 51.

At this time, the PCR circuit 51 sends the clock reference pcr to the realtime streaming decoder 12 of the second content receiving apparatus 4 with a UDP (User Datagram Protocol) of a lower layer than the RTP protocol, resulting in being capable of coping with live streaming requiring realtime processes with ensuring high speed property.

Figure 9:
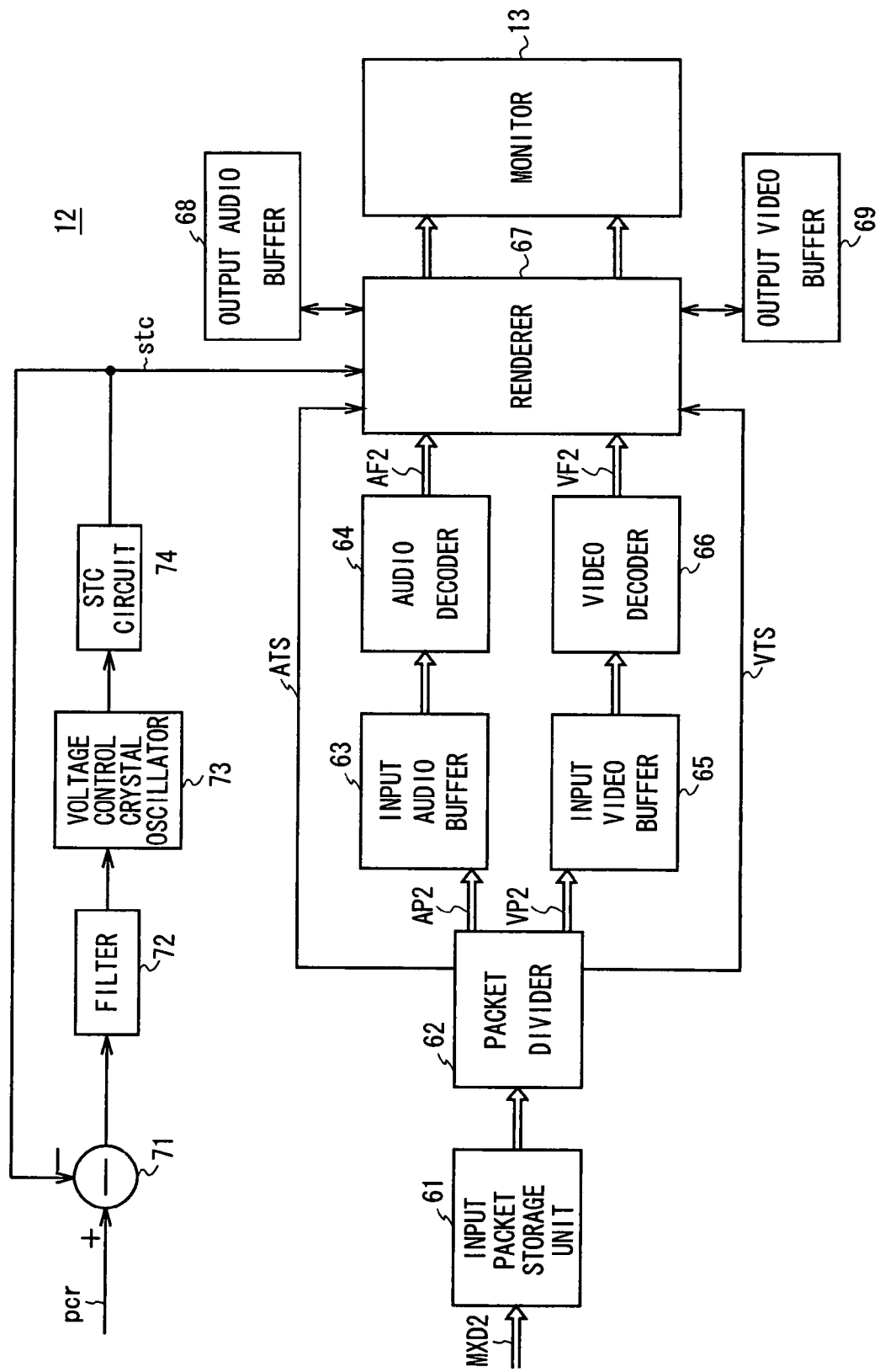
FIG. 9 is a schematic block diagram showing circuitry of a realtime streaming decoder of a second content receiving apparatus.

(6) Circuitry of Realtime Streaming Decoder of Second Content Receiving Apparatus As shown in FIG. 9, the realtime streaming decoder 12 of the second content receiving apparatus 4 stores multiplexed data. MXD2 received from the realtime streaming encoder 11 of the first content receiving apparatus 3, in an input packet storage unit 61 once and sends it to a packet divider 62.

The packet divider 62 divides the multiplexed data MXD2 into video packet data VP2 and audio packet data AP2 and further divides the audio packet data AP2 into audio packets and audio time stamps ATS, and sends the audio packets to the audio decoder 64 on an audio frame basis via the input audio buffer 63 comprising a ring buffer and sends the audio time stamps ATS to a renderer 67.

In addition, the packet divider 62 divides the video packet data VP2 into video packets and video time stamps VTS, and sends the video packets frame by frame to a video decoder 66 via an input video buffer comprising a ring buffer and sends the video time stamps VTS to the renderer 67.

The audio decoder 64 decodes the audio packet data AP2 on an audio frame basis to restore the audio frames AF2 before the compression-encoding, and sequentially sends them to the renderer 67.

The video decoder 66 decodes the video packet data VP2 on a video frame basis to restore the video frames VF2 before the compression-encoding and sequentially sends them to the renderer 67.

The renderer 67 stores the audio time stamps ATS in a queue and temporarily stores the audio frames AF2 in an output audio buffer 68 comprising a ring buffer. In addition, similarly, the renderer 67 stores the video time stamps VTS in a queue and temporarily stores the video frames VF2 in an output video buffer 69 comprising a ring buffer.

The renderer 67 adjusts the final output timing based on the audio time stamps ATS and the video time stamps VTS for the lip-syncing of the video of the video frames VF2 and the audio of the audio frames AF2 to be output to the monitor 13, and then outputs the video frames VF2 and the audio frames AF2 to the monitor 13 from the output video buffer 69 and the output audio buffer 68 at the output timing.

By the way, the realtime streaming decoder 12 receives and inputs a clock reference pcr to a subtraction circuit 71, the clock reference pcr sent from the PCR circuit 51 of the realtime streaming encoder 11 of the first content receiving apparatus 3 with the UDP.

The subtraction circuit 71 calculates a difference between the clock reference pcr and the system time clock stc supplied from the system time clock circuit 74, and feeds it back to the subtraction circuit 71 via a filter 72, a voltage control crystal oscillator circuit 73, and the system time clock circuit 74 in order forming a PLL (Phase Locked Loop), gradually converges it on the clock reference pcr of the realtime streaming encoder 11, and finally supplies the system time clock stc being in synchronization with the realtime streaming encoder 11 based on the clock reference pcr, to the renderer 67.

Thereby, the renderer 67 is capable of compressing and encoding the video data VD2 and the audio data AD2 in the realtime streaming encoder 11 of the first content receiving apparatus 3, and adjusting the output timing of the video frames VF2 and the audio frames AF2 on the basis of the system time clock stc being in synchronization with the clock frequency which is used for counting the video time stamps VTS and the video time stamps ATS.

In actual, the renderer 67 is designed to temporarily store the audio frames AF2 in the output audio buffer 68 comprising a ring buffer and temporarily store the video frames VF2 in the output video buffer 69 comprising a ring buffer, and to adjust the output timing according to the audio time stamps ATS and the video time stamps VTS on the basis of the system time clock stc being synchronized with the encoder side by using the clock reference pcr supplied from the PCR circuit 51 of the realtime streaming encoder 11, so as to output lip-sync video and audio.

Figure 10:
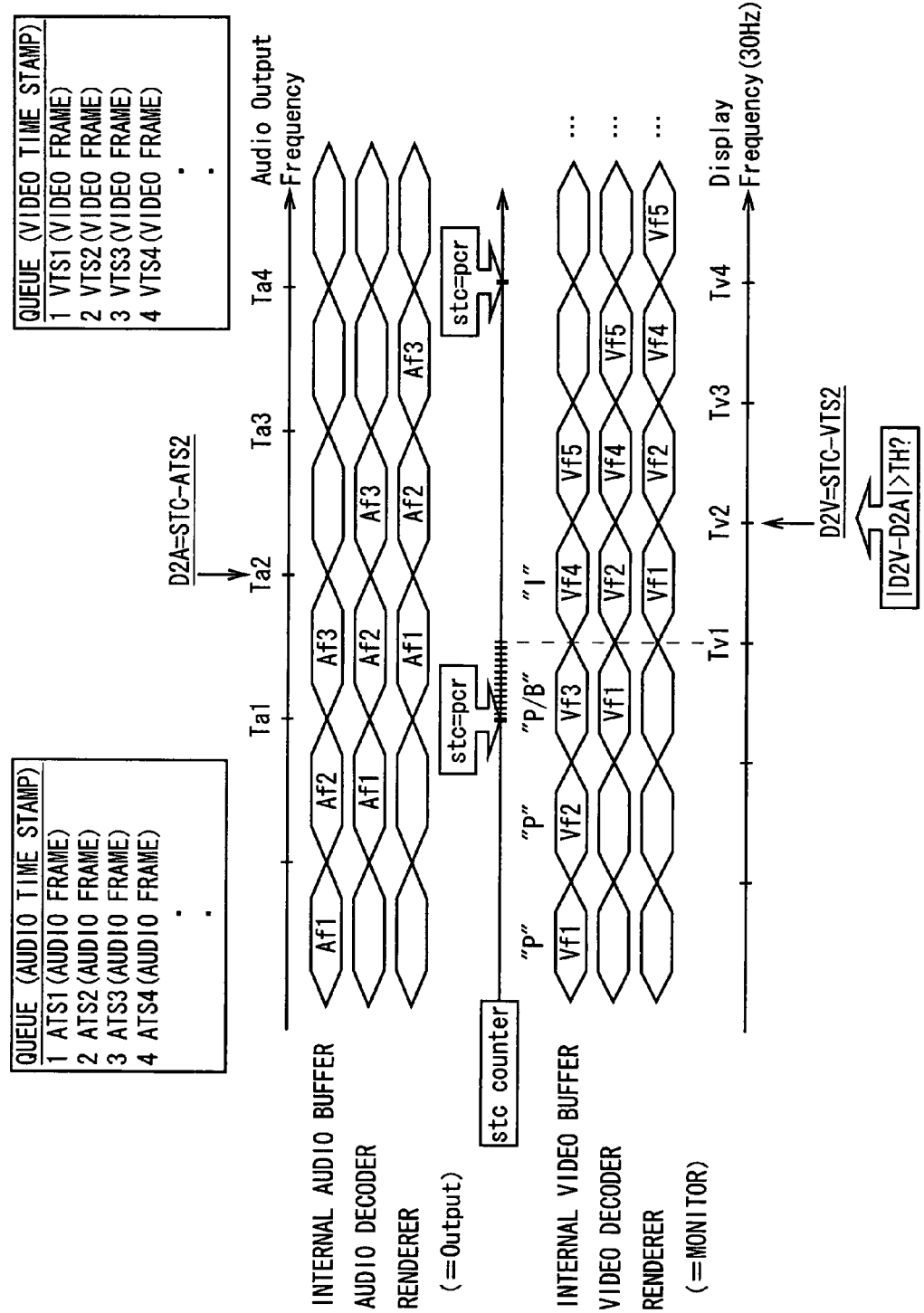
FIG. 10 is a schematic drawing explaining output timing of video frames and audio frames in live streaming.

(7) Lip-Syncing Adjustment Process of Decoder Side
(7-1) Output Timing Adjustment Method of Video Frames and Audio Frames in Live Streaming As shown in FIG. 10, in this case, the renderer 67 locks the clock frequency of the system time clock stc to the value of the clock reference pcr which is supplied from the PCR circuit 51 of the realtime streaming encoder 11 at prescribed periods, with the PPL, and then controls the output of the audio frames AF2 and the video frames VF2 according to the audio time stamps ATS and the video time stamps VTS via the monitor 13 synchronized based on the system time clock stc.

That is, the renderer 67 sequentially outputs the audio frames AF2 (Af1, Af2, Af3, . . . ) to the monitor 13 according to the system time clock stc and the audio time stamps ATS (ATS1, ATS2, ATS3, . . . ) in a situation where the clock frequency of the system time clock stc is adjusted to the value of the clock reference pcr.

The value of the clock reference pcr and the clock frequency of the system time clock stc are in synchronization with each other as described above. Therefore, as to the counted value of the system time clock stc and the video time stamps VTS (VTS1, VTS2, VTS3, . . . ), the differential value D2V between the counted value of the system time clock stc and the video time stamp VTS1 is not generated at time Tv1, for example.

However, the clock reference pcr which is supplied from the PCR circuit 51 of the realtime streaming encoder 11 is sent with the UDP, and its retransmission is not controlled due to emphasizing high speed property. Therefore, the clock reference pcr may not reach the realtime streaming decoder 12 of the second content receiving apparatus 4 or reaches there with error data.

In such cases, the synchronization between the value of the clock reference pcr supplied from the PCR circuit 51 of the realtime streaming encoder 11 at prescribed periods and the clock frequency of the system time clock stc may be shifted via the PLL. In this case, the renderer 67 of this invention is able to ensure lip-syncing as well.

In this invention, when a lag occurs between the system time clock stc, and an audio time stamp ATS and a video time stamp VTS, the continuousness of audio output is prioritized in the lip-syncing.

The renderer 67 compares the counted value of the system time clock stc with the audio time stamp ATS2 at output timing Ta2 of the audio frames AF2, and stores their differential value D2A. On the other hand, the renderer 67 compares the counted value of the system time clock stc with the video time stamp VTS at the output timing Tv2 of the video frames VF2 and stores their differential value D2V.

At this time, when the clock reference pcr surely reaches the realtime streaming decoder 12 of the second content receiving apparatus 4, the value of the clock reference pcr and the clock frequency of the system time clock stc of the real time streaming decoder 12 are fully matched via the PLL, and the decoder side including the monitor 13 is in synchronization with the system time clock stc, the differential values D2V and D2A become "0".

When the differential value D2A is a positive value, the audio frames AF2 are determined as fast. When the value D2A is a negative value, the audio frames AF2 are determined as late. Similarly, when the differential value D2V is a positive value, the video frames VF2 are determined as fast. When the value D2V is a negative value, the video frames VF2 are determined as late.

When the audio frames AF2 are faster or later, the renderer 67 operates with giving priority to the continuous of audio output, and relatively controls the output of the video frames VF2 to the audio frames AF2 as follows.

For example, a case where |D2V-D2A| is larger than the threshold value TH and the differential value D2V is larger than the differential value D2A means that video does not catch up with audio. In this case, the renderer 67 skips the video frame Vf3 corresponding to, for example, a B-picture composing the GOP without decoding, and outputs the next video frame Vf4.

A case where |D2V-D2A| is larger than the threshold value TH and the differential value D2A is larger than the differential value D2V means that audio does not catch up with video. In this case, the renderer 67 repeatedly outputs the video frame Vf2 being output.

When |D2V-D2A| is smaller than the threshold value TH, a lag between audio and video is within an allowable range. In this case, the renderer 67 outputs the video frames VF2 to the monitor 13 as they are.

(7-2) Lip-Syncing Adjustment Procedure in Live Streaming

Figure 11:
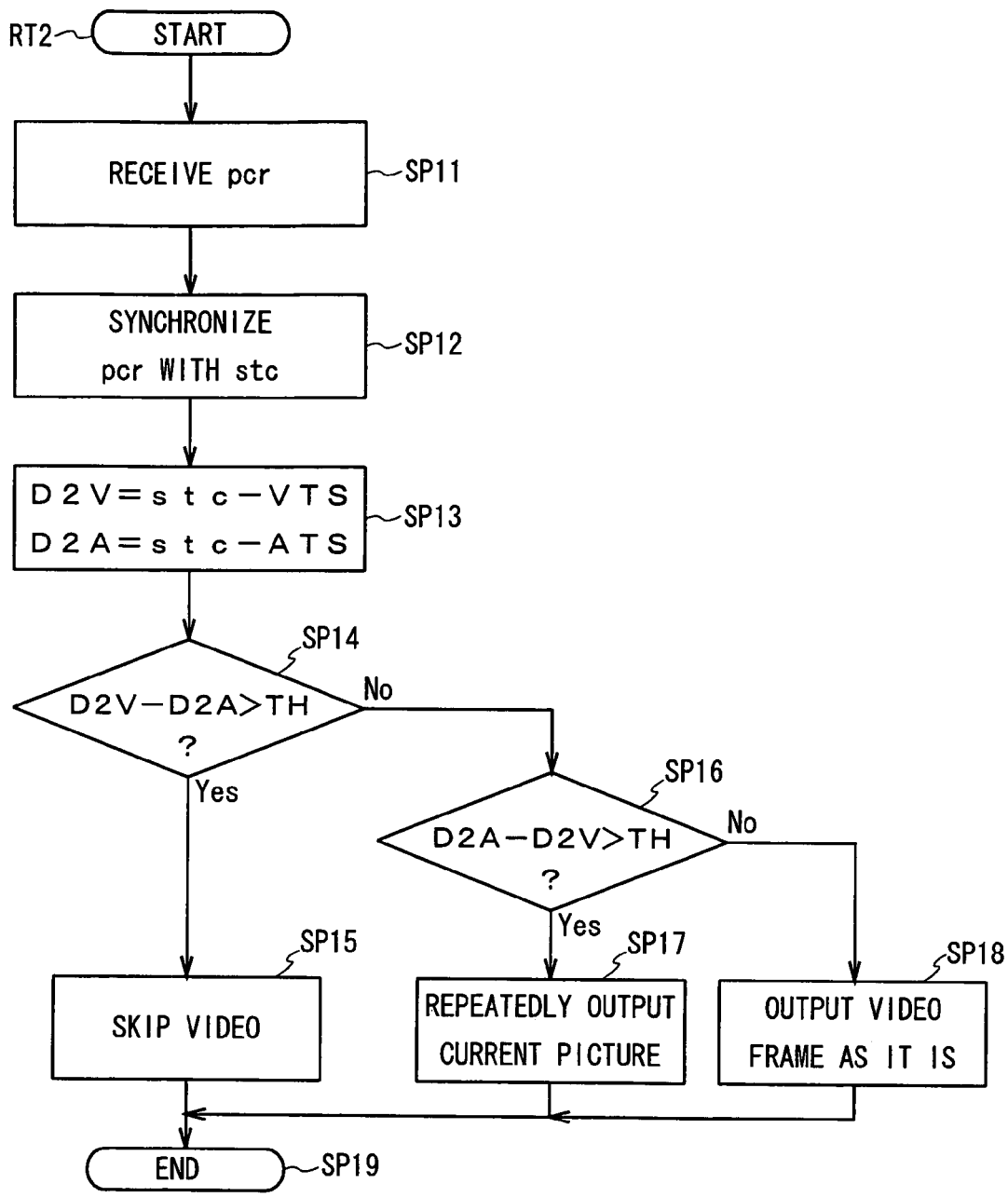
FIG. 11 is a schematic flowchart showing a lip-syncing adjustment procedure in the live streaming.

An output timing adjustment method for adjusting the output timing of the video frames VF2 on the basis of the audio frames AF2 for the lip-syncing of video and audio when the renderer 67 of the realtime streaming decoder 12 performs the live streaming reproduction as described above will be summarized. As shown in the flowchart of FIG. 11, the renderer 67 of the realtime streaming decoder 12 enters the start step of a routine RT2 and moves on to next step SP11.

At step SP11, the renderer 67 of the realtime streaming decoder 12 of the second content receiving apparatus 4 receives the clock reference pcr from the PCR circuit 51 of the realtime streaming encoder 11 of the first content receiving apparatus 3, and moves on to next step SP12.

At step SP12, the renderer 67 synchronizes the system time clock stc with the clock reference pcr with the PLL composed of the subtraction circuit 71, the filter 72, the voltage control crystal oscillator circuit 73, and the system time clock circuit 74, and then uses the system time clock stc synchronized with the clock reference pcr, as a basis for adjusting the output timing, and moves on to next step SP13.

At step SP13, the renderer 67 calculates the differential value D2V between the counted value of the system time clock stc and a video time stamp VTS at time Tv1, Tv2, Tv3, . . . , and calculates the differential value D2A between the counted value of the system time clock stc and an audio time stamp ATS at a time Ta1, Ta2, Ta3, . . . , and then moves on to next step SP14.

At step SP14, the renderer 67 compares the differential values D2V and D2A calculated at step SP13. When the differential value D2V is larger than the differential value D2A by the threshold value TH (for example, 100 [msec]) or larger, the renderer 67 determines that video is behind audio and moves on to next step SP15.

Since it is determined that video is behind audio, the renderer 67 skips, for example, a B-picture (video frame Vf3) without decoding at step SP15 and performs outputting, so that the video can catch up with the audio, resulting in the lip-syncing. The renderer 67 moves on to next step SP19 where this process is completed.

In this case, the renderer 67 does not skip "P" picture because they can be reference frames for next pictures, and skips "B" pictures which are not affected by the skipping, resulting in being capable of adjusting the lip-syncing while previously preventing picture quality deterioration.

When it is determined at step SP14 that the differential value D2V is not larger than the differential value D2A by the threshold value TH (For example, 100 [msec]) or larger, the renderer 67 moves on to step SP16.

When it is determined at step SP16 that the differential value D2A is larger than the differential value D2V by the threshold value TH (for example, 100 [msec]) or larger, the renderer 67 determines that video is faster than audio, and moves on to next step SP17.

Since video is faster than audio, the renderer 67 repeatedly outputs the video frame VF2 composing a picture being output so that the audio catches up with the video at step SP17, and moves on to next step SP19 where this process is completed.

When it is determined at step SP16 that the difference between the differential value D2A and the differential value D2V is within the threshold value TH, it is determined that there is no lag between audio and video. In this case, the process moves on to next step SP18.

At step SP18, since it can be considered that there is no lag between video and audio, the renderer 67 outputs the video frames VF2 to the monitor 13 as they are, based on the system time cock stc synchronized with the clock reference pcr, and moves on to the next step SP19 where this process is completed.

Note that the renderer 67 is designed to output audio as it is in any of the above cases to keep sound continuousness.

As described above, the renderer 67 of the realtime streaming encoder 12 of the second content receiving apparatus 4 synchronizes the system time clock stc of the realtime streaming decoder 12 with the clock reference pcr of the realtime streaming encoder 11 of the first content receiving apparatus 3 to realize the live streaming reproduction. In addition, even if the cock reference pcr is not controlled so as to be re-transmitted and does not arrive, the renderer 67 executes the lip-syncing adjustment according to a lag between the audio time stamps ATS and the video time stamps VTS with respect to the system time clock stc, resulting in realizing the lip-syncing in the live streaming reproduction properly.

(8) Operation and Effects

According to the above configuration, at a time of outputting the audio frames AF1 (Af1, Af2, Af3, . . . ) at certain times Ta1, Ta2, Ta3, . . . , the streaming decoder 9 of the first content receiving apparatus 3 presets the system time clock stc with the audio time stamps ATS (ATS1, ATS2, ATS3, . . . ).

Then, the renderer 37 of the streaming decoder 9 calculates the differential value D1 between the counted value of the system time clock stc preset with the audio time stamps ATS (ATS1, ATS2, ATS3, . . . ) and the video time stamps VTS (VTS1, VTS2, VTS3, . . . ) attached to the video frames VF1 (Vf1, Vf2, Vf3, . . . ), so as to recognize a time difference which occurs due to a difference between the clock frequency of the encoder side which attaches the video time stamps VTS and the clock frequency of the system time clock stc of the decoder side.

Then the renderer 37 of the streaming decoder 9 repeatedly outputs the current picture of the video frames VF2, or skips, for example, a B-picture without decoding and performs the outputting, according to the differential value D1, so as to adjust the output timing of video to audio while keeping the continuousness of the audio to be output to the monitor 10.

When the differential value D1 is the threshold value TH or lower and users cannot recognize the lip-sync errors, the renderer 37 can perform outputting according to the video time stamps VTS (VTS1, VTS2, VTS3, . . . ) without the repeat output and the skip reproduction. In this case, the video continuousness can be kept.

Further, the renderer 67 of the realtime streaming decoder 12 of the second content receiving apparatus 4 can synchronize the system time clock stc of the decoder side with the clock reference pcr supplied from the PCR circuit 51 of the realtime streaming encoder 11 of the first content receiving apparatus 3 and output the audio frames AF2 and the video frames VF2 to the monitor 13 according to the audio time stamps ATS and the video time stamps VTS, resulting in being capable of realizing the live streaming reproduction while keeping the realtime property.

Further, even if the synchronization of the system clock stc with the clock reference pcr cannot be performed because the clock reference pcr which is supplied from the PCR circuit 51 of the realtime streaming encoder 11 of the first content receiving apparatus 3 is not re-transmitted with the EDP and therefore does not arrive, the renderer 67 of the realtime streaming decoder 12 of the second content receiving apparatus 4 calculates the differential value D2V between the system time clock stc and the video time stamps VTS and the differential value D2A between the system time clock stc and the audio time stamps ATS to adjust the output timing of the video frames VF2 according to the difference between the differential values D2V and D2A, thereby being capable of adjusting the output timing of video to audio while keeping the continuousness of the audio to be output to the monitor 13.

According to the above configuration, the renderer 37 of the streaming decoder 9 of the first content receiving apparatus 3 and the renderer 67 of the realtime streaming decoder 12 of the second content receiving apparatus 4 can adjust the output timing of the video frames VF1 and VF2 based on the output timing of the audio frames AF1 and AF2, resulting in realizing the lip-syncing without making users who are watchers feel discomfort while keeping sound continuousness.

(9) Other Embodiments

Note that the above embodiment has described a case where the difference between the clock frequency of the encoder side and the clock frequency of the decoder is absorbed by adjusting the lip-syncing according to the differential value D1, or D2V and D2A based on the audio frames AF1, AF2. This invention, however, is not limited to this and a slight difference between the clock frequency of the encoder side and the clock frequency of the decoder side, which occurs due to clock jitter and network jitter, can be absorbed.

Further, the above embodiment has described a case of realizing the pre-encoded streaming by connecting the content provision apparatus 2 and the first content receiving apparatus 3 via the Internet 5. This invention, however, is not limited to this and the pre-encoded steaming can be realized by connecting the content provision apparatus 2 and the second content receiving apparatus 4 via the Internet 5, or by providing content from the content provision apparatus 2 to the second content receiving apparatus 4 via the first content receiving apparatus 3.

Furthermore, the above embodiment has described a case of performing the live streaming between the first content receiving apparatus 3 and the second content receiving apparatus 4. This invention, however, is not limited to this and the live streaming can be performed between the content provision apparatus 2 and the first content receiving apparatus 3 or between the content provision apparatus 2 and the second content receiving apparatus 4.

Furthermore, the above embodiment has described a case of skipping B-pictures and performing outputting. This invention, however, is not limited to this and the outputting is performed with skipping P-pictures existing just before I-pictures.

This is because the P-pictures existing just before the I-pictures are not referred to create next I-pictures. That is, if these P-pictures are skipped, the creation of the I-pictures is not affected and the picture quality does not deteriorate.

Furthermore, the above embodiment has described a case of skipping the video frame Vf3 without decoding and performing the outputting to the monitor 10. This invention, however, is not limited to this and at a stage of outputting the video frame Vf3 from the output video buffer 39 after decoding, the outputting can be performed with skipping the decoded video frame Vf3.

Furthermore, the above embodiment has described a case of outputting all the audio frames AF1, AF2 to the monitor 10, 13 in order to use them as a basis to perform the lip-syncing adjustment. This invention, however, is not limited to this and in a case where there is an audio frame containing no sound, the outputting can be performed with skipping this audio frame.

Furthermore, the above embodiment has described a case where a content receiving apparatus according to this invention is composed of an audio decoder 35, 64 and a video decoder 36, 66, serving as a decoding means, an input audio buffer 33, 63 and an output audio buffer 38, 68, serving as a storage means, and a renderer 37, 67 serving as a calculation means and timing adjustment means. This invention, however, is not limited to this and the content receiving apparatus can have another circuitry.

INDUSTRIAL APPLICABILITY

A content receiving apparatus, a video/audio output timing control method and a content provision system of this invention can be applied to download and display moving picture content with sound from a server, for example.

The invention claimed is:

1. A content receiving apparatus comprising:
    decoding means for receiving and decoding a plurality of encoded video frames sequentially given video time stamps based on a reference clock of an encoder side and a plurality of encoded audio frames sequentially given audio time stamps based on the reference clock, from a content provision apparatus of said encoder side;
    storage means for storing a plurality of video frames and a plurality of audio frames obtained by decoding the encoded video frames and the encoded audio frames with said decoding means;
    receiving means for receiving the reference clock of said encoder side sent from said content provision apparatus with a UDP;
    calculation means for synthesizing the system time clock of said decoder side with the reference clock of said encoder side and calculating a time difference that occurs due to a difference between a clock frequency of the reference clock of said encoder side and a clock frequency of a system time clock of a decoder side; and
    timing adjustment means for adjusting video frame output timing for sequentially outputting the plurality of video frames frame by frame, on a basis of audio frame output timing for sequentially outputting the plurality of audio frames frame by frame, according to the time difference,
    in which the calculation means is operable (i) to perform a first determination which determines whether the time difference is longer than a prescribed time, and (ii) when a result of the first determination indicates that the time difference is longer than the prescribed time, to perform a second determination which determines whether the video time stamps are behind the audio time stamps, and
    in which timing adjustment means is operable to control outputting of the video frames in accordance with the result of the first determination and, when performed, a result of the second determination.

2. The content receiving apparatus according to claim 1, wherein
    said timing adjustment means outputs the video frames according to the video time stamps based on the system time clock of said decoder side when the result of the first determination indicates that the time difference is shorter than the prescribed time.

3. The content receiving apparatus according to claim 1, wherein
    said timing adjustment means skips video frames of B-pictures and performs outputting when the result of the first determination indicates that the time difference is longer than the prescribed time and the result of the second determination indicates that the video time stamps are behind the audio time stamps.

4. The content receiving apparatus according to claim 1, wherein
    said timing adjustment means skips video frames of B-pictures locating just before I-pictures and performs outputting when the result of the first determination indicates that the time difference is longer than the prescribed time and the result of the second determination indicates that the video time stamps are behind the audio time stamps.

5. The content receiving apparatus according to claim 1, wherein
    said timing adjustment means repeatedly outputs a video frame of a current picture when the result of the first determination indicates that the time difference is longer than the prescribed time and the result of the second determination indicates that the video time stamps are faster than the audio time stamps.

6. A video/audio output timing control method comprising:
    a decoding step of causing decoding means to receive and decode a plurality of encoded video frames sequentially given video time stamps based on a reference clock of an encoder side and a plurality of encoded audio frames sequentially given audio time stamps based on the reference clock from a content provision apparatus of said encoder side;
    a storage step of causing storage means to store a plurality of video frames and a plurality of audio frames obtained by decoding the encoded video frames and the encoded audio frames at said decoding step;
    a receiving step of receiving the reference clock of said encoder side sent from said content provision apparatus with a UDP;
    a difference calculation step of synthesizing the system time clock of said decoder side with the reference clock of said encoder side and causing calculation means to calculate a time difference that occurs due to a difference between a clock frequency of the reference clock of said encoder side and a clock frequency of a system time clock of a decoder side; and
    a timing adjustment step of causing timing adjustment means to adjust video frame output timing for sequentially outputting the plurality of video frames frame by frame, on a basis of audio frame output timing for sequentially outputting the plurality of audio frames frame by frame, according to the time difference,
    in which the calculation step performs (i) a first determination which determines whether the time difference is longer than a prescribed time, and (ii) when a result of the first determination indicates that the time difference is longer than the prescribed time, performs a second determination which determines whether the video time stamps are behind the audio time stamps, and in which timing adjustment step controls outputting of the video frames in accordance with the result of the first determination and, when performed, a result of the second determination.

7. A content provision system comprising a content provision apparatus and a content receiving apparatus, wherein:

said content provision apparatus comprises:

encoding means for creating a plurality of encoded video frames given video time stamps based on a reference clock of an encoder side and a plurality of encoded audio frames given audio time stamps based on the reference clock;

first transmission means for sequentially transmitting the plurality of encoded video frames and the plurality of encoded audio frames to said content receiving apparatus; and second transmission means for transmitting the reference clock of the encoder side with a UDP; and said content receiving apparatus comprises:

decoding means for receiving and decoding the plurality of encoded video frames sequentially given the video time stamps and the plurality of encoded audio frames sequentially given the audio time stamps, from said content provision apparatus of said encoder side;

storage means for storing a plurality of video frames and a plurality of audio frames obtained by decoding the encoded video frames and the encoded audio frames with said decoding means;

calculation means for calculating a time difference that occurs due to a difference between a clock frequency of the reference clock of said encoder side and a clock frequency of a system time clock of a decoder side; and timing adjustment means for adjusting video frame output timing for sequentially outputting the plurality of video frames frame by frame, on a basis of audio frame output timing for sequentially outputting the plurality of audio frames frame by frame, according to the time difference, in which the calculation means is operable (i) to perform a first determination which determines whether the time difference is longer than a prescribed time, and (ii) when a result of the first determination indicates that the time difference is longer than the prescribed time, to perform a second determination which determines whether the video time stamps are behind the audio time stamps, and in which timing adjustment means is operable to control outputting of the video frames in accordance with the result of the first determination and, when performed, a result of the second determination.

* * * * *